United States Patent
Zhang et al.

(10) Patent No.: US 12,096,377 B2
(45) Date of Patent: Sep. 17, 2024

(54) BEAM MANAGEMENT FOR EMISSION POWER

(71) Applicant: Apple Inc., Cupertino, CA (US)

(72) Inventors: Yushu Zhang, Beijing (CN); Chunhai Yao, Beijing (CA); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Oghenekome Oteri, San Diego, CA (US); Wei Zeng, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 283 days.

(21) Appl. No.: 17/442,079

(22) PCT Filed: Sep. 15, 2021

(86) PCT No.: PCT/US2021/050477
§ 371 (c)(1),
(2) Date: Sep. 22, 2021

(87) PCT Pub. No.: WO2022/081290
PCT Pub. Date: Apr. 21, 2022

(65) Prior Publication Data
US 2023/0100695 A1     Mar. 30, 2023

(30) Foreign Application Priority Data
Oct. 18, 2020     (WO) ................ PCT/CN2020/121733

(51) Int. Cl.
*H04W 52/24*  (2009.01)
*H04W 52/08*  (2009.01)
*H04W 52/36*  (2009.01)

(52) U.S. Cl.
CPC ......... *H04W 52/241* (2013.01); *H04W 52/08* (2013.01); *H04W 52/242* (2013.01); *H04W 52/365* (2013.01)

(58) Field of Classification Search
CPC ..... H04W 52/06; H04W 52/08; H04W 52/18; H04W 52/241; H04W 52/242; H04W 52/267; H04W 52/32; H04W 52/365
See application file for complete search history.

(56) References Cited

U.S. PATENT DOCUMENTS 9,107,175 B2 *   8/2015   Kim ...................... H04W 72/21
10,764,832 B2 *  9/2020   Comsa ................ H04W 52/146
(Continued)

FOREIGN PATENT DOCUMENTS

EP    3886486       9/2021
WO    2020143048    7/2020

OTHER PUBLICATIONS

International Patent Application No. PCT/US2021/050477, International Search Report and the Written Opinion, Mailed on Feb. 28, 2022, 19 pages.

(Continued)

*Primary Examiner* — Quochien B Vuong
(74) *Attorney, Agent, or Firm* — Kilpatrick Townsend & Stockton LLP

(57) ABSTRACT

The present application relates to devices and components including apparatus, systems, and methods to provide beam management for beams with reduced maximum transmission power.

19 Claims, 11 Drawing Sheets

(56) References Cited

U.S. PATENT DOCUMENTS 11,271,635 B2* 3/2022 Enescu ............. H04W 72/1273
2022/0295322 A1* 9/2022 Haghighat ............ H04W 24/10

OTHER PUBLICATIONS

Discussion on Multi-Beam Operation Enhancements, Oppo, 3GPP TSG RAN WG1 #98, R1-1908352, Aug. 30, 2019, 9 pages.
Enhancement on FR2 MPE mitigation, ZTE, 3GPP TSG RAN WG4 Meeting #93, R4-1913920, Nov. 22, 2019, 4 pages.
Enhancements on UL beam management, ZTE, 3GPP TSG RAN WG1 Meeting #97, R1-1906251, May 17, 2019, 3 pages.
International Patent Application No. PCT/US2021/050477, Invitation to Pay Additional Fees and, Where Applicable Protest Fee, Mailed on Nov. 30, 2021, 13 pages.
3rd Generation Partnership Project; Technical Specification Group Radio Access Network; NR; Physical layer procedures for data (Release 16), 3GPP TS 38.214 V16.3.0, Sep. 2020, 166 pages.
3rd Generation Partnership Project; Technical Specification Group Radio Access Network; NR; Medium Access Control (MAC) protocol specification (Release 16), 3GPP TS 38.321 V16.2.1, Sep. 2020, 154 pages.
3rd Generation Partnership Project; Technical Specification Group Radio Access Network; NR; Radio Resource Control (RRC) protocol specification (Release 16), 3GPP TS 38.331 V16.2.0, Sep. 2020, 921 pages.

* cited by examiner

```
CSI-ReportConfig ::=   SEQUENCE {
    reportConfigId                              CSI-ReportConfigId,
    carrier                                     ServCellIndex                           OPTIONAL,  -- Need S
    resourcesForChannelMeasurement              CSI-ResourceConfigId,
    csi-IM-ResourcesForInterference             CSI-ResourceConfigId                    OPTIONAL,  -- Need R
    nzp-CSI-RS-ResourcesForInterference         CSI-ResourceConfigId                    OPTIONAL,  -- Need R
    <unrelated part omitted>
    reportQuantity                              CHOICE {
        none                                        NULL,
        cri-RI-PMI-CQI                              NULL,
        cri-RI-i1                                   NULL,
        cri-RI-i1-CQI                               SEQUENCE {
            pdsch-BundleSizeForCSI                      ENUMERATED (n2, n4)
        },
        cri-RI-CQI                                  NULL,
        cri-RSRP                                    NULL,
        ssb-Index-RSRP                              NULL,
        cri-RI-LI-PMI-CQI                           NULL,
        cri-Phr                                     NULL,
        ssb-Index-Phr                               NULL
    },
    ...
}
```

```
CSI-ReportConfig ::=    SEQUENCE {
    reportConfigId              CSI-ReportConfigId,
    carrier                     ServCellIndex
    resourcesForChannelMeasurement   CSI-ResourceConfigId,
    csi-IM-ResourcesForInterference  CSI-ResourceConfigId    OPTIONAL,   -- Need S
    nzp-CSI-RS-ResourcesForInterference  CSI-ResourceConfigId    OPTIONAL,   -- Need R
    <unrelated part omitted>
    reportQuantity              CHOICE {
        none                        NULL,
        cri-RI-PMI-CQI              NULL,
        cri-RI-i1                   NULL,
        cri-RI-i1-CQI               SEQUENCE {
            pdsch-BundleSizeForCSI      ENUMERATED {n2, n4}
        }                                                   -- Need S
        cri-RI-CQI                  NULL,
        cri-RSRP                    NULL,
        ssb-Index-RSRP              NULL,
        cri-RI-LI-PMI-CQI           NULL,
        cri-Phr-RSRP                NULL,
        ssb-Index-Phr-RSRP          NULL
    }   OPTIONAL,
}
```

Figure 7

```
CSI-ReportConfig ::=            SEQUENCE {
    reportConfigId                  CSI-ReportConfigId,
    carrier                         ServCellIndex,
    resourcesForChannelMeasurement  CSI-ResourceConfigId,
    csi-IM-ResourcesForInterference CSI-ResourceConfigId            OPTIONAL,    -- Need S
    nzp-CSI-RS-ResourcesForInterference CSI-ResourceConfigId        OPTIONAL,    -- Need R
    <unrelated part omitted>
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}     OPTIONAL,    -- Need S
        },
        cri-RI-CQI                      NULL,
        cri-RSRP                        NULL,
        ssb-Index-RSRP                  NULL,
        cri-RI-LI-PMI-CQI               NULL,
        cri-Pcmax                       NULL,
        ssb-Index-Pcmax                 NULL
    },
```

```
CSI-ReportConfig ::=         SEQUENCE {
    reportConfigId
    carrier                                              CSI-ReportConfigId,
    resourcesForChannelMeasurement                       servCellIndex                    OPTIONAL,   -- Need S
    csi-IM-ResourcesForInterference                      CSI-ResourceConfigId,
    nzp-CSI-RS-ResourcesForInterference                  CSI-ResourceConfigId             OPTIONAL,   -- Need R
    <unrelated part omitted>                             CSI-ResourceConfigId             OPTIONAL,   -- Need R
    reportQuantity                                       CHOICE {
        none                                                 NULL,
        cri-RI-PMI-CQI                                       NULL,
        cri-RI-i1                                            NULL,
        cri-RI-i1-CQI                                        SEQUENCE {
            pdsch-BundleSizeForCSI                               ENUMERATED {n2, n4}
            -- Need S
        },
        cri-RI-CQI                                           NULL,
        cri-RSRP                                             NULL,
        ssb-Index-RSRP                                       NULL,
        cri-RI-LI-PMI-CQI                                    NULL,
        cri-Pcmax-RSRP                                       NULL,
        ssb-Index-Pcmax-RSRP
    },
```

BEAM MANAGEMENT FOR EMISSION POWER

CROSS-REFERENCES TO RELATED APPLICATIONS

This application is a 371 U.S. National Phase of PCT International Patent Application No. PCT/US2021/050477, filed on Sep. 15, 2021, which claims the benefit of PCT International Application No. PCT/CN2020/121733, filed on Oct. 18, 2020. The contents of both applications are incorporated herein by reference in their entirety for all purposes.

BACKGROUND

Use of user equipment has become a common occurrence in the lives of many individuals. User equipment may transmit signals in beams directed in different directions from the user equipment, where a portion of the beams may be emitted toward objects and/or beings near the user equipment. An amount of emission may be defined for beams emitted toward the objects and/or beings.

BRIEF DESCRIPTION OF THE DRAWINGS

FIG. 6 illustrates an example channel state information configuration report information element in accordance with some embodiments.

FIG. 7 illustrates another example channel state information configuration report information element in accordance with some embodiments.

FIG. 8 illustrates another example channel state information configuration report information element in accordance with some embodiments.

FIG. 9 illustrates another example channel state information configuration report information element in accordance with some embodiments.

DETAILED DESCRIPTION

Figure 1:
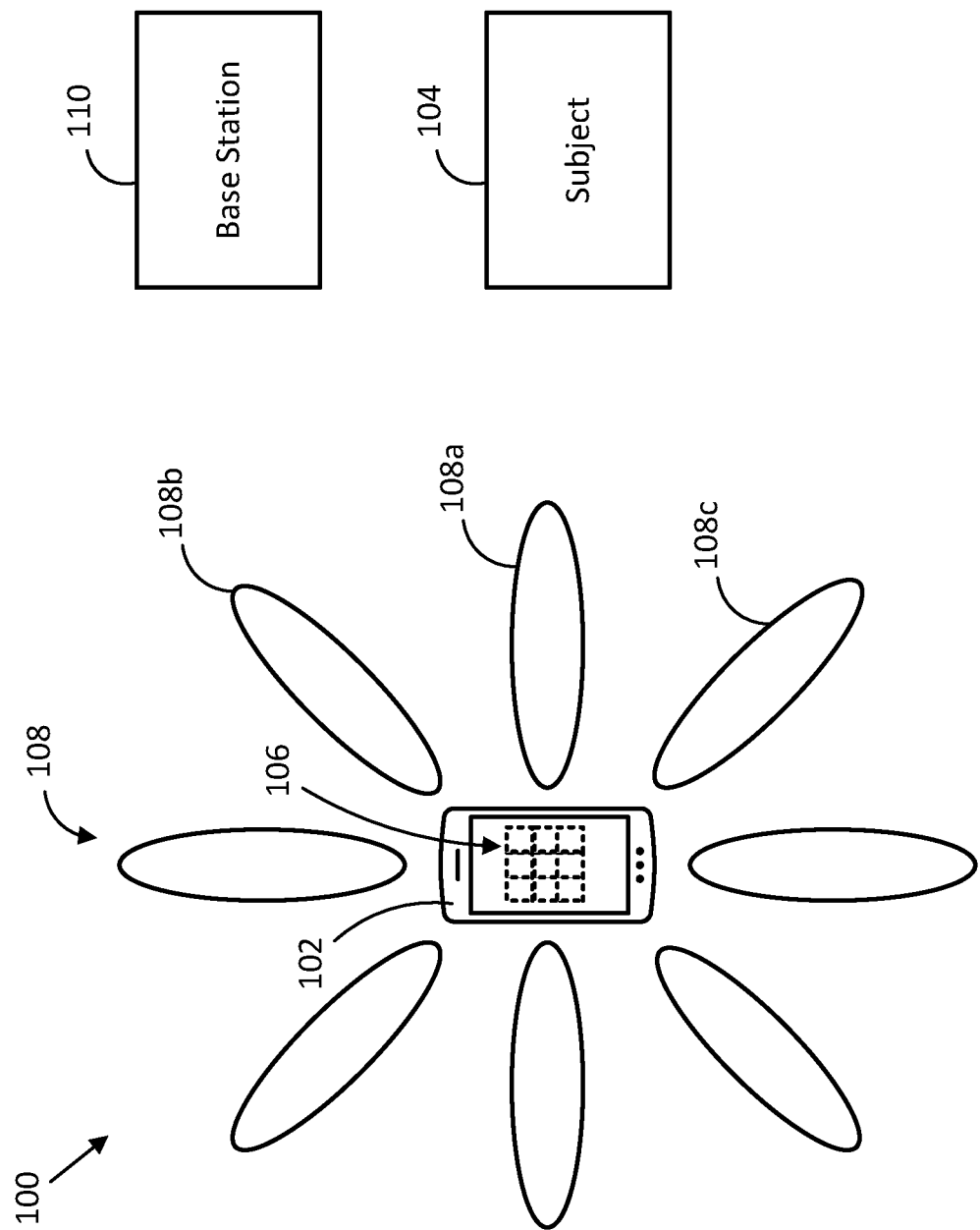
FIG. 1 illustrates an example network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The term "subject" as used herein refers to one or more objects. Such an object may be a human being. In some embodiments, the term "subject" may refer to a human being, another living being, or some other object to which a maximum permittable exposure (MPE) may be assigned.

FIG. 1 illustrates an example network environment 100 in accordance with some embodiments. In particular, the network environment 100 illustrates possible locations of a user equipment (UE) 102 and a subject 104 in accordance with some instances.

Figure 11:
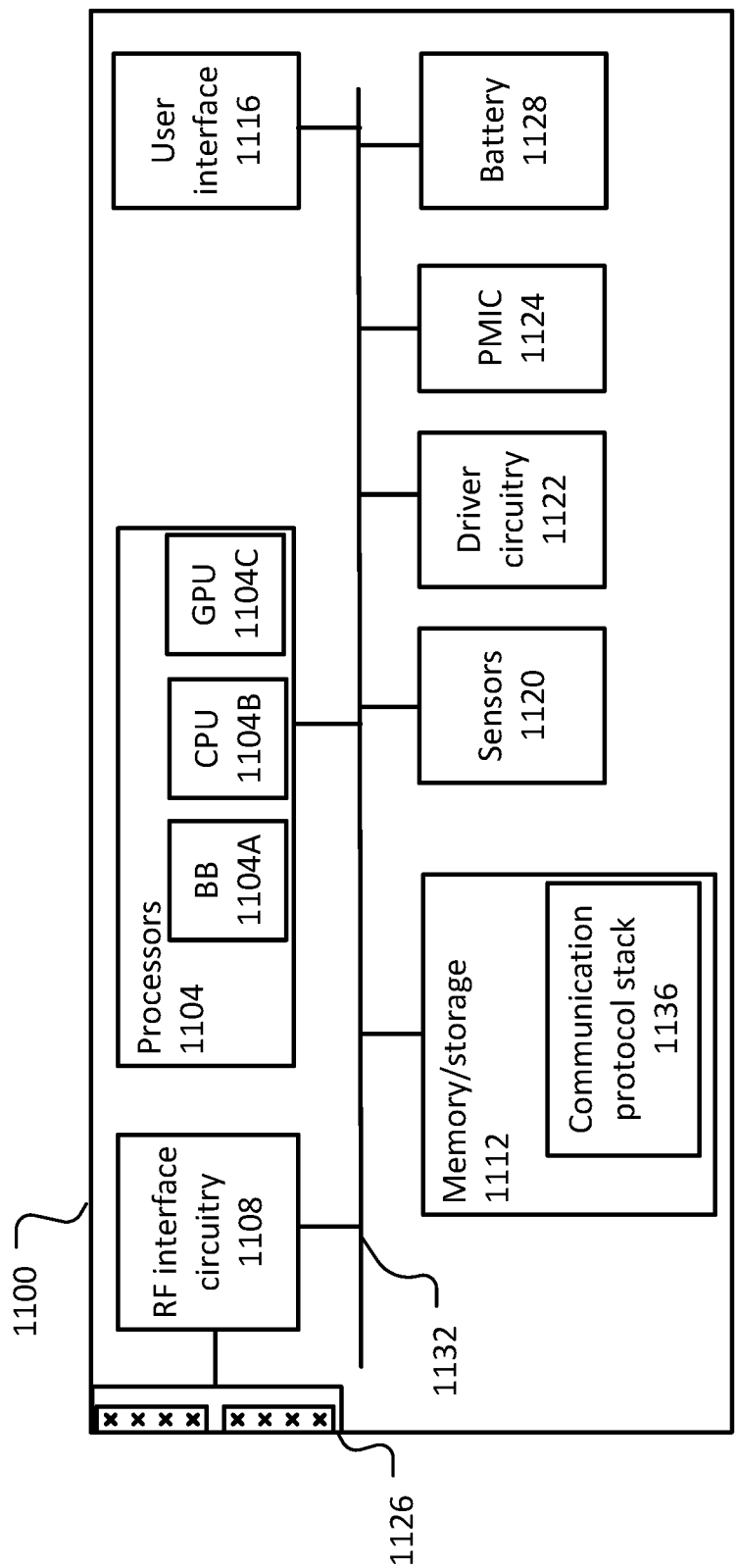
FIG. 11 illustrates an example user equipment in accordance with some embodiments.

The network environment 100 includes a UE 102, such as the UE 1100 (FIG. 11). The UE 102 may be part of a radio access network (RAN) and may utilize the RAN to communicate with one or more other devices. Multi-panel operation may be applied for a UE, where different directional panels can target to different directions. For example, the UE 102 may include one or more panels 106 of antennas that may be utilized for communication with the RAN. The panels 106 may emit one more beams 108 out of the UE 102 for communication with the RAN. The beams 108 may be emitted in multiple different directions form the UE 102. In some embodiments, the panels 106 may be directional panels, where each of the directional panels may emit the beams in different directions. For example, one of the panels 106 may emit beams in a first direction while another of the panels 106 may emit beams in a second direction. In other embodiments, a portion of the antennas within a panel may emit beams in a first direction and another portion of the antennas within the panel may emit beams in a second direction. In the illustrated embodiment, a limited number of panels 106 and a limited number of beams are illustrated for clarity, but it should be understood that there may be more or less panels 106 and/or beams 108 in other embodiments and the beams 108 may emitted from the UE 102 in more, less, or different directions than illustrated.

The network environment 100 includes a subject 104. The subject 104 may be located within a proximity of the UE 102. For example, the subject 104 may be located within a certain distance of the UE 102, where the distance may be less than a threshold distance for a standard emission power of the beams 108. Some UE beams in a panel or multiple panels may target toward a subject. For example, the main-lobe or side-lobe of the beam may target toward a subject. Further, one or more beams 108 of the UE 102 may be emitted toward the subject 104. In particular, a main-lobe or a side-lobe of a beam may be emitted toward the subject 104. In the illustrated embodiment, a first beam 108a may be emitted toward the subject 104, such that a main lobe of the first beam 108a may be emitted toward the subject 104. Other beams, such as a second beam 108b and a third beam 108c, may have side-lobes of the beams emitted toward the subject 104. With regard to emission exposure, UE may either backoff maximum transmission power or avoid using the beam or beams targeted to a subject that exceed a maximum permittable exposure (MPE). Amounts of exposure due to beams is described further in relation to FIG. 2 and FIG. 3.

The subject 104 may have an assigned MPE from the beams 108. In particular, the MPE may define an amount of exposure that the subject 104 is to experience from the beams 108. An amount of exposure caused by a beam on the subject 104 may be dependent on a direction of the beam relative to the subject 104, a distance of the subject 104 from the UE 102, a transmission power of the beam, or some combination thereof. If the amount of exposure of a beam exceeds the MPE, operation of the beam may be modified. The modification of the operation of the beam may comprise backoff of the maximum transmission power of the beam. For example, the first beam 108a may exceed the MPE for the subject 104 in the illustrated embodiment during normal operation. Accordingly, a maximum transmission power of the first beam 108a may be backed off to meet the MPE for the subject 104.

The network environment 100 includes a base station 110 (such as the gNB 1200 (FIG. 12)). The base station 110 may be part of a radio access network (RAN) (such as a third generation partnership project (3GPP) RAN). In embodiments, the RAN may include one or more base stations having the features, or similar features, to the base station 110. The base station 110 may exchange transmissions with the UE 102, where the transmissions may facilitate operations of the UE 102. For example, the RAN may be responsible for the definition of functions, requirements, and/or interfaces for the UE 102. The RAN may be based on new wide band, multimode, flexible radio access. The base station 110 may configure the UE 102 for use within the RAN.

Some approaches have been applied for addressing the situation where a beam during normal operation exceeds the MPE for the subject. In one approach, a duty cycle is introduced, where no uplink signal is transmitted during the duty cycle. In this approach, significant uplink performance can be observed. In another approach the UE may report a power management maximum power reduction (P-MPR) to a next generation Node B (gNB) to make the gNB aware of the power backoff. In this approach, there is no way for the gNB to know the power backoff for a candidate beam, so that the gNB cannot compare the performance between the current beam and another beam candidate or other beam candidates. In another approach, the UE can perform uplink/downlink beam reporting separately. In this approach, switching to a new beam would lead to performance degradation and some of the beams emitted toward the subject could still work well with a certain backoff. In another approach, the UE can report power headroom (PHR) per beam. In this approach, PHR calculation is based on higher layer filtered reference signal received power (RSRP), which requires larger measurement latency, and the PHR cannot reflect the beam quality with regard to different P-MPR for different beams.

Some different approaches were evaluated to determine which approach for addressing the beams emitted toward the subject provides the best spectrum efficiency. A baseline approach included beam selection without panel switching and the UE continuing to utilize the beam emitted toward the subject with a 10 decibel (dB) power backoff. A second approach included beam/panel selection with UE specific P-MPR. A third approach included beam/panel selection with panel specific P-MPR. A fourth approach included beam/panel selection based on uplink reception power. The fourth approach provided a best spectrum efficiency. Accordingly, the approaches described throughout this disclosure may be based on this fourth approach.

While backing off the maximum transmission power of a beam may be utilized to meet the MPE for the subject 104, the reduction of the maximum transmission power may present issues with communication with other devices within the RAN. For example, a base station (such as the gNB 1200 (FIG. 12)) may misinterpret and/or fail to identify transmissions on the beam due to the reduction of the maximum transmission power. Further, the base station may schedule transmissions on beam when the beam is inadequate for the transmissions and/or better beam options for the transmissions exist. The approaches described throughout this disclosure may assist in informing the base station of the backoff of the maximum transmission power of a beam to avoid failing to identify transmissions on the beam and/or scheduling transmissions on the beam when better beam options for the transmissions exist. Some embodiments describe UL-Rx-power-based beam selection. Aspects of these embodiments include description of control signaling for beam reports, beam report content, and beam indication with regard to different preferred (for example, best) beam for different bandwidths.

Figure 2:
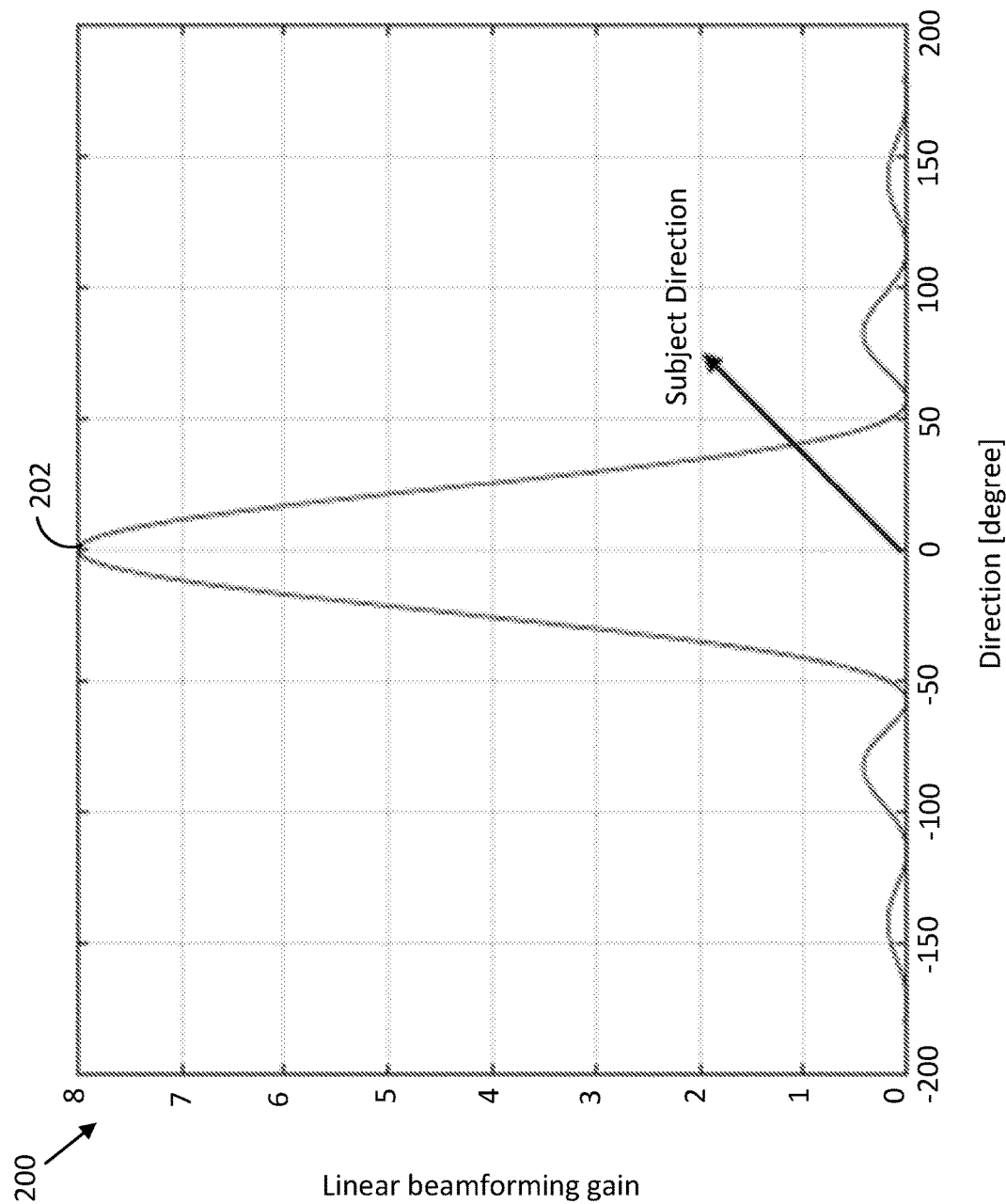
FIG. 2 illustrates an example beamforming graph in accordance with some embodiments.

FIG. 2 illustrates an example beamforming graph 200 in accordance with some embodiments. In particular, the graph 200 illustrates an example amount of beamforming gain produced by a beam emitted from a UE, such as the UE 102. Further, the graph 200 illustrates a direction of the UE from the subject. In particular, the subject is illustrated at an angle of 0 degrees in the graph 200.

The beam forming gain has a peak 202 of a main-lobe at the angle of 0 degrees in the graph 200. Accordingly, the beam that produces the beam forming gain may be emitted directly at the subject in the illustrated embodiment. Given the subject is at direction of 0 degree, it may be determined that the exposure exceeds the MPE. The beam forming gain may be compared to a threshold to determine whether the emission of the beam to the subject exceeds an MPE for the subject. In the illustrated embodiment, the peak 202 may exceed the threshold and the emission of the beam may exceed the MPE for the subject. Accordingly, it may be determined that the maximum transmission power should be backed off in this instance.

In Rel-15 (3GPP Organizational Partners. 3rd Generation Partnership Project; Technical Specification Group Radio Access Network. (Release 15))/Rel-16 (3GPP Organizational Partners. 3rd Generation Partnership Project; Technical Specification Group Radio Access Network. (Release 16)), there are two options defined to handle this issue. Option 1: a duty cycle is introduced where no uplink signal is transmitted during the duty cycle. A potential drawback for option 1 is significant UL performance degradation can be observed. Option 2: UE reports a P-MPR (maximum power reduction) to gNB to let gNB aware power backoff. A potential drawback for option 2 is that there is no way for gNB to know the power backoff for a candidate beam so that gNB cannot compare the performance between current beam and other candidate beam(s).

In addition, there are some other options that have been discussed to handle this issue. Option 3: UE can perform UL/DL beam reporting separately. A potential drawback for option 3 is some beams targeted toward a subject can still work well with a certain power backoff, and to always switch to a new beam would lead to performance degradation. Option 4: UE can report power headroom (PHR) per beam. A potential drawback for option 4 is PHR calculation is based on higher layer filtered RSRP, which requires larger measurement latency, and PHR cannot reflect the beam quality with regard to different P-MPR for different beams.

4 schemes have been investigated by system level evaluation. Scheme 1 (baseline): beam selection without panel switching. UE keep using the beam targeted toward a subject that exceeds the MPE with 10 dB power backoff. Scheme 2: beam/panel selection with UE specific P-MPR. Scheme 3: beam/panel selection with panel specific P-MPR. Scheme 4: beam/panel selection based on UL Rx power. It was observed that scheme 4 provided the best spectrum efficiency (SE).

Figure 3:
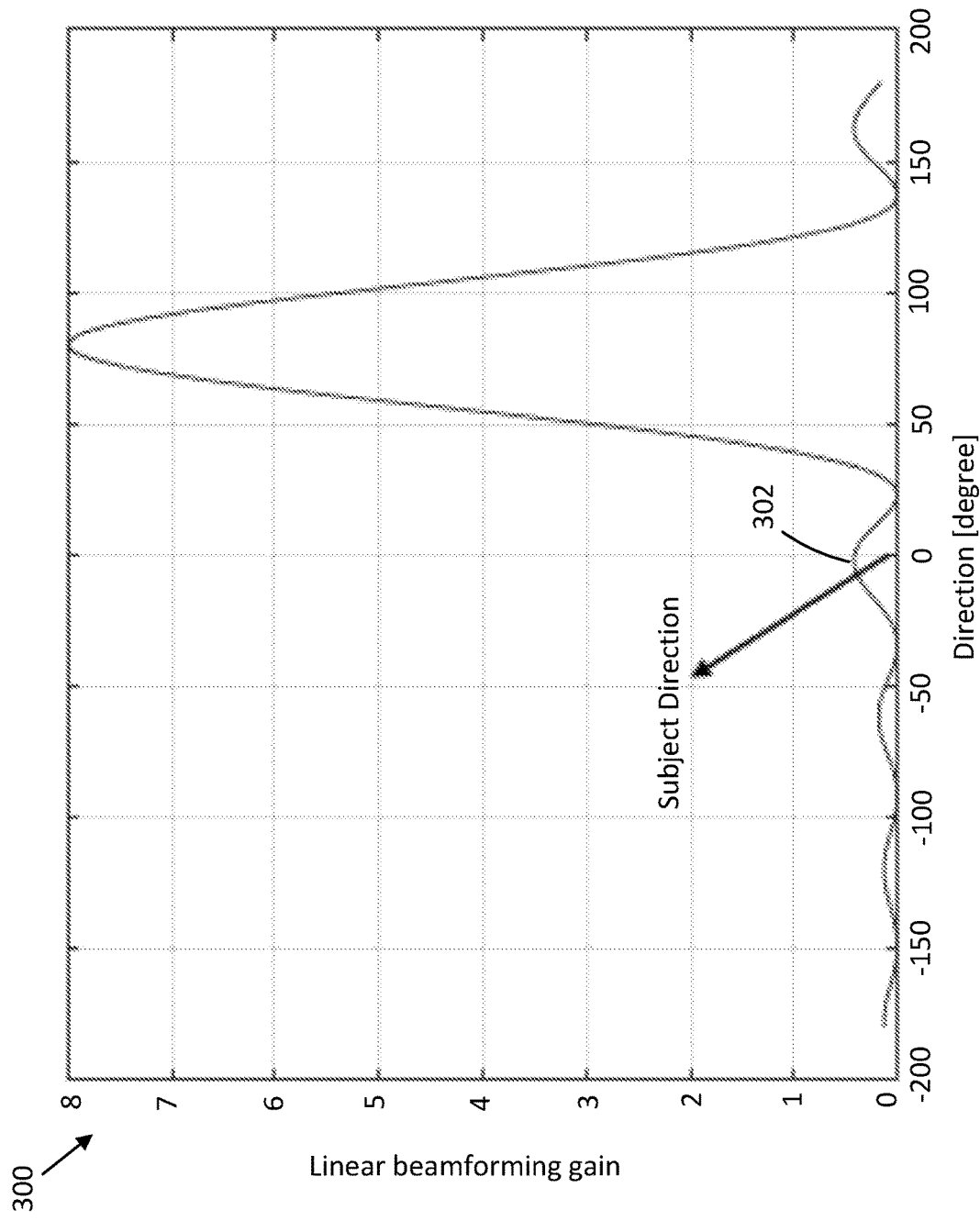
FIG. 3 illustrates another example beamforming graph in accordance with some embodiments.

FIG. 3 illustrates another example beamforming graph 300 in accordance with some embodiments. In particular, the graph 300 illustrates an example amount of beamforming gain produced by a beam emitted from a UE, such as the UE 102. Further, the graph 300 illustrates a direction of the UE from the subject. In particular, the subject is illustrated at an angle of 0 degrees in the graph 300.

The beam forming gain has a peak 302 of a side-lobe at the angle of 0 degrees in the graph 300. Accordingly, the beam that produces the beam forming gain may be emitted at an angle to the subject in the illustrated embodiment, but a side-lobe may be emitted at the subject. The beam forming gain may be compared to a threshold to determine whether the emission of the beam to the subject exceeds an MPE for the subject. Given the subject is at direction of 0 degree, it may be determined that the exposure exceeds the MPE. In the illustrated embodiment, the peak 302 may exceed the threshold and the emission of the beam may exceed the MPE for the subject. Accordingly, it may be determined that the maximum transmission power should be backed off in this instance.

Figure 4:
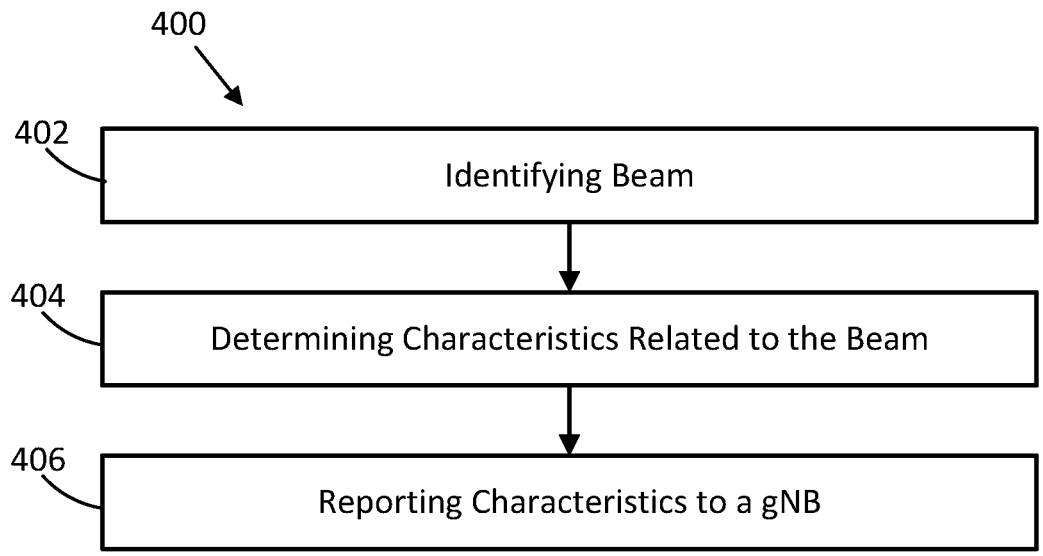
FIG. 4 illustrates an example beam characteristics reporting procedure in accordance with some embodiments.

FIG. 4 illustrates an example beam characteristics reporting procedure 400 in accordance with some embodiments. In particular, the procedure 400 may include determining characteristics related to a beam and reporting the characteristics to another device within a RAN. The procedure 400 may be performed by a UE (such as the UE 1100 (FIG. 11)) and may report the characteristics to a base station (such as the gNB 1200 (FIG. 12)).

The procedure 400 may include identifying a beam for which the procedure 400 is to be performed in 402. The beam identified may be a beam for which a maximum transmission power may be backed off. For example, the procedure 400 may include identifying a subject (such as the subject 104) within a proximity of the UE and identifying a beam that exceeds the MPE for the subject based on the beam being emitted toward the subject. The procedure 400 may be repeated for beams that exceed the MPE of the subject.

The procedure 400 may include determining characteristics related to the beam identified in 402 in 404. In a first option, the characteristics may include a virtual PHR for the beam, a maximum power transmission (P_cmax) for the beam, a maximum power reduction (P_MPR) for the beam, and/or a layer 1 reference signal received power (L1-RSRP). The virtual PHR may be calculated by P_cmax−P_MPR−(P0+alpha*pathloss+f). If multiple closed-loop index are configured, the closed-loop index to calculate f can be predefined or configured by higher layer signaling. The pathloss to calculate virtual PHR can be determined by the L1-RSRP or higher layer filtered RSRP. In some of the embodiments of the first option, P_cmax and P_MPR may be included as a single value of maximum transmission power which equals to P_cmax−P_MPR.

In a second option, the characteristics may include a P_cmax, P_MPR, L1-RSRP, closed loop power control factor f as well as beam index, i.e. SSB resource index (SSBRI) or CSI-RS resource index (CRI). If multiple closed-loop index are configured, the closed-loop index to calculate f can be predefined or configured by higher layer signaling. In some of the embodiments of the second option, the characteristics may not include f Further, in some of the embodiments of the second option, P_cmax and P_MPR may be included as a single value of maximum transmission power which equals to P_cmax−P_MPR.

The virtual PHR may be determined based on the P_cmax, the P_MPR, a targeting receiving power (P0), path loss (pathloss), a factor (alpha) to compensate for pathloss, and/or a closed-loop power control factor (f). The P0 and the alpha may be provided by higher layers. The f may be maintained by the UE for a closed loop power control process based on the transmit power control (TPC) command indicated by gNB prior to the report. The closed-loop power control process index to determine f may be predefined or configured by higher layer signaling. For example, the closed-loop power control process index to determine f may be predefined to be the first closed-loop process index or configured by higher layer signaling if multiple closed-loop indexes are configured. In some embodiments, the TPC may be indicated by downlink control information (DCI). The pathloss may be determined by L1-RSRP in some embodiments. In other embodiments, the pathloss may be determined by higher layer filtered RSRP. The virtual PHR may be performed by calculating P_cmax−P_MPR−(P0+alpha*pathloss+f).

The procedure 400 may include reporting the characteristics to the base station in 406. In particular, a UE may be configured to report the characteristics to the base station, such as being configured by radio resource control (RRC) signaling. In the first option, when configured, UE can report a virtual PHR, P_cmax, P_MPR, L1-RSRP as well as beam index, i.e. SSB resource index (SSBRI) or CSI-RS resource index (CRI). For example, the procedure 400 may include reporting the virtual PHR, the P_cmax, the P_MPR, and/or the L1-RSRP as well as beam index (for example the SSBRI or the CRI) to the base station in some embodiments. The characteristics may be reported by physical uplink control channel (PUCCH) or physical uplink shared channel (PUSCH). In some embodiments of the first option, the P_cmax and the P_MPR may be reported by a single value of modified maximum transmission power which equals to P_cmax−P_MPR. For example, the modified maximum transmission power may be determined by P_cmax−P_MPR, and the modified maximum transmission power may be reported to the base station.

In the second option, when configured, UE can report a P_cmax, P_MPR, L1-RSRP, closed loop power control factor f as well as beam index, i.e. SSBRI or CRI. For example, the procedure 400 may include reporting the P_cmax, the P_MPR, the L1-RSRP, and/or the closed loop power control factor f as well as beam index as well as beam index (for example the SSBRI or the CRI) to the base station in some embodiments. The characteristics may be reported by PUCCH or PUSCH. In some embodiments of the second option, f may not be reported. In some embodiments of the first option, the P_cmax and the P_MPR may be reported by a single value of modified maximum transmission power which equals to P_cmax−P_MPR. For example, the modified maximum transmission power may be determined by P_cmax−P_MPR, and the modified maximum transmission power may be reported to the base station.

In the first option, the PHR related parameters including PHR, P_cmax, P_MPR can be reported together with the L1-RSRP for a beam or separately. For example, the characteristics may be reported as a candidate value separate from the L1-RSRP in an information element in some embodiments of the first option. FIG. 6 illustrates an example channel state information configuration report (CSI-ReportConfig) information element 600 in accordance with some embodiments. In some embodiments of the first option, new candidate values as 'cri-Phr' and 'ssb-Index-Phr' in a report quantity can be added. For example, the characteristics and the beam index may be reported as candidate values separate from the L1-RSRP in the CSI-ReportConfig information element 600. The virtual PHR, the P_cmax, and the P_MPR may be reported as a first candidate value (cri-Phr) within the CSI-ReportConfig information element 600 and the beam index may be reported as a second candidate value (ssb-Index-Phr) in the CSI-ReportConfig information element 600.

In other embodiments of the first option, the characteristics may be reported together with the L1-RSRP as a candidate value in an information element. FIG. 7 illustrates another example CSI-ReportConfig information element 700 in accordance with some embodiments. In particular, the characteristics may be reported with the L1-RSRP as a candidate value in the CSI-ReportConfig information element 700 and the beam index may be reported as another candidate value in the CSI-ReportConfig information element 700. New candidate value as 'cri-Phy-RSRP' and 'ssb-Index-Phy-RSRP' in a report quantity can be added. The virtual PHR, the P_cmax, the P_MPR, and the L1-RSRP may be reported as a first candidate value (cri-Phr-RSRP) and the beam index may be reported as a second candidate value (ssb-Index-Phr-RSRP) in the CSI-ReportConfig information element 700.

The priority for this new CSI report type can be calculated with assumption of k=−1 or k=0 or k=2 for the equation below. For example, priorities of the CSI-ReportConfig information element 600 and the CSI-ReportConfig information element 700 may be calculated with a priority value of $Pri_{iCSI}(y, k, c, s)=2N_{cell}M_s y + N_{cell}M_s k + M_s c + s$. y may be equal to 0 when the CSI-ReportConfig information element 600 or the CSI-ReportConfig information element 700 is to be an aperiodic channel state information (CSI) report carried on the PUSCH, y may be equal to 1 when the CSI-ReportConfig information element 600 or the CSI-ReportConfig information element 700 is to be a semi-persistent CSI report carried on the PUSCH, y may be equal to 2 when the CSI-ReportConfig information element 600 or the CSI-ReportConfig information element 700 is to be a semi-persistent CSI report carried on the PUCCH, and y may be equal to 3 when the CSI-ReportConfig information element 600 or the CSI-ReportConfig information element 700 is to be a periodic CSI report carried on the PUCCH. The value of k for the CSI-ReportConfig information element 600 and the CSI-ReportConfig information element 700 may be equal to −1, 0, or 2. c may be a value of a serving cell index. $N_{cell}$ may be a maximum number of serving cells, which may be the value of the higher layer parameter maxNrofServingCells. s may be the report configuration identifier (reportConfigID). $M_s$ may be a maximum number of report configurations, which may be the value of the higher layer parameter maxNrofCSI-ReportConfigurations.

In other embodiments, the procedure 400 may include reporting the P_cmax, the P_MPR, the L1-RSRP, and/or the f to the base station in 406. The characteristics may be reported by PUCCH or PUSCH in some embodiments. In some embodiments, the P_cmax and the P_MPR may be reported as a single value. For example, a modified maximum transmission power may be determined by P_cmax−P_MPR, and the modified maximum transmission power may be reported to the base station.

In the second option, the power control related factors including P_cmax, P_MPR and closed loop power control factor f can be reported together with the L1-RSRP for a beam or separately. For example, the characteristics may be reported as a candidate value separate from the L1-RSRP in an information element in some embodiments of the second option. FIG. 8 illustrates an example CSI-ReportConfig information element 800 in accordance with some embodiments. In particular, the characteristics and the beam index may be reported as candidate values separate from the L1-RSRP in the CSI-ReportConfig information element 800. New candidate values as 'cri-Pcmax' and 'ssb-Index-Pcmax' in a report quantity can be added. For example, the P_cmax, the P_MPR, and the f may be reported as a first candidate value (cri-Pcmax) within the CSI-ReportConfig information element 800 and the beam index may be reported as a second candidate value (ssb-Index-Pcmax) in the CSI-ReportConfig information element 800.

In other embodiments of the second option, the characteristics may be reported together with the L1-RSRP as a candidate value in an information element. FIG. 9 illustrates another example CSI-ReportConfig information element 900 in accordance with some embodiments. In particular, the characteristics may be reported with the L1-RSRP as a candidate value in the CSI-ReportConfig information element 900 and the beam index may be reported as another candidate value in the CSI-ReportConfig information element 900. New candidate value as 'cri-Pcmax-RSRP' and 'ssb-Index-Pcmax-RSRP' in a report quantity can be added. For example, the P_cmax, the P_MPR, L1-RSRP, and the f may be reported as a first candidate value (cri-Pcmax-RSRP) and the beam index may be reported as a second candidate value (ssb-Index-Pcmax-RSRP) in the CSI-ReportConfig information element 900.

The priority for this new CSI report type can be calculated with assumption of k=−1 or k=0 or k=2 for the following equation. For example, priorities of the CSI-ReportConfig information element 800 and the CSI-ReportConfig information element 900 may be calculated with a priority value of $Pri_{iCSI}(y, k, c, s)=2N_{cell}M_s y + N_{cell}M_s k + M_s c + s$. y may be equal to 0 when the CSI-ReportConfig information element 800 or the CSI-ReportConfig information element 900 is to be an aperiodic CSI report carried on the PUSCH, y may be equal to 1 when the CSI-ReportConfig information element 800 or the CSI-ReportConfig information element 900 is to be a semi-persistent CSI report carried on the PUSCH, y may be equal to 2 when the CSI-ReportConfig information element 800 or the CSI-ReportConfig information element 900 is to be a semi-persistent CSI report carried on the PUCCH, and y may be equal to 3 when the CSI-ReportConfig information element 800 or the CSI-ReportConfig information element 900 is to be a periodic CSI report carried on the PUCCH. The value of k for the CSI-ReportConfig information element 800 and the CSI-ReportConfig information element 900 may be equal to −1, 0, or 2. c may be a value of a serving cell index. $N_{cell}$ may be a maximum number of serving cells, which may be the value of the higher layer parameter maxNrofServingCells. s may be the reportConfigID. $M_s$ may be a maximum number of report configurations, which may be the value of the higher layer parameter maxNrofCSI-ReportConfigurations.

Figure 5:
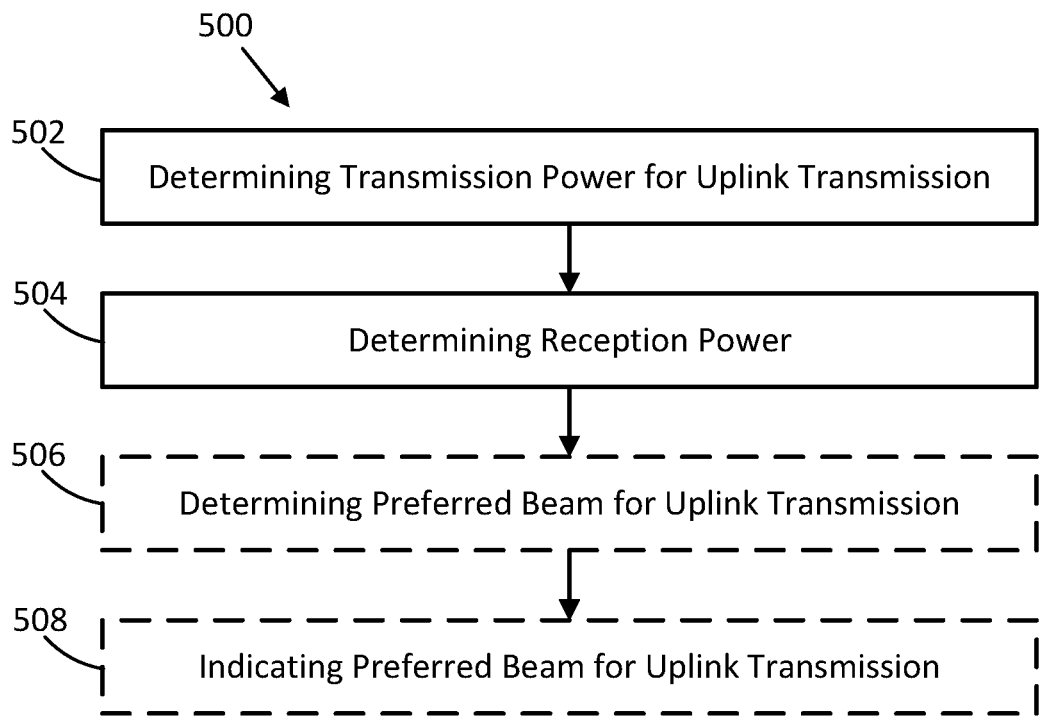
FIG. 5 illustrates an example reception power determination procedure in accordance with some embodiments.

FIG. 5 illustrates an example reception power determination procedure 500 in accordance with some embodiments. The procedure 500 may be performed by a base station (such as the gNB 1200 (FIG. 12)). In particular, the base station may perform the procedure 500 utilizing the characteristics reported in 406 (FIG. 4) of the procedure 400 (FIG. 4) to determine a reception power for the beam related to the characteristics.

A reception (Rx) power for a resource element can be calculated as P_rx=P_tx−10log 10(M_SC)−pathloss, where M_SC indicates a total number of scheduled subcarriers. Further, the transmission power (P_tx) can be calculated as P_tx=min{P0+10*log 10(N_RB*u)+alpha*pathloss+f+delta, P_cmax−P_MPR}, where N_RB indicates a number of scheduled resource blocks, u indicates a subcarrier spacing (SCS) scaler with 15 kilohertz (kHz) as a baseline (e.g. for 120 kHz SCS, u equals 8), P0 and alpha are provided by higher layer parameters, f denotes closed loop power control factor, delta is a factor determined by modulation and coding scheme (MCS), P_cmax indicates the maximum transmission power. All parameters are defined in a bandwidth part (BWP).

Thus the Rx power can be calculated as follows. If P0+10*log 10(N_RB*u)+alpha*pathloss+f+delta>P_cmax−P_MPR, P_rx=P_cmax−P_MPR−10log 10(M_SC)−pathloss. Otherwise, P_rx=P0+10*log 10(u/N_SC_RB)+(alpha−1)*pathloss+f+delta, where N_SC_RB denotes number of subcarriers per resource block. However, the reception power calculations described above do not take into account the effect of back off. Herein disclosed are some approaches to support UL Rx power based beam selection, including: Control signaling for beam report; Beam report content; and Beam indication with regard to different best beam for different bandwidth.

The procedure 500 may include determining a transmission power for uplink transmission in 502. In particular, the base station may utilize the characteristics, or some portion thereof, reported in 406 to determine the transmission power for uplink transmission of the beam related to the characteristics. In some embodiments, the base station may utilize the P_cmax, the P_MPR, and/or the virtual PHR (virtual_PHR) reported in 406 to determine the transmission power for uplink transmission. The base station may further utilize a number of scheduled resource blocks (N_RB) for the beam, a subcarrier spacing (SCS) scaler (u) for the beam, and/or a factor (delta) determined by modulation and coding scheme (MCS) for the UE to determine the transmission power for uplink transmission. The u may be a u with 15 kilohertz (kHz) as a baseline. For example, for 120 kHz SCS, u may be equal to 8. At the gNB side, it can perform the beam selection based on stages. In first stage of a first option with the virtual PHR, the P_MPR, and the P_cmax, gNB can calculate the tx power for a uplink transmission as P_tx=P_cmax−P_MPR−virtual_PHR+10*log 10(N_RB*u)+delta. For example, the transmission power (P_tx) may be determined by the base station by the equation P_tx=P_cmax−P_MPR−virtual_PHR+10*log 10(N_RB*u)+delta.

In other embodiments, the base station may utilize the L1-RSRP, the f, the P_cmax, and/or the P_MPR reported in 406 to determine the transmission power for uplink transmission. The base station may further utilize the N_RB, the u, the delta, the P0, the alpha, and/or the energy per resource element (EPRE) for the synchronization signal block/channel state information reference signal (SSB/CSI-RS) to determine the transmission power for uplink transmission. In first stage of a second option, gNB can calculate the tx power for a uplink transmission as P_tx=min{P0+10*log 10(N_RB*u)+alpha*(L1-RSRP−P_tx_0)+f+delta, P_cmax−P_MPR}. For example, the transmission power (P_tx) may be determined by the equation P_tx=min{P0+10*log 10(N_RB*u)+alpha (L1-RSRP−P_tx_0)+f+delta, P_cmax−P_MPR}, where P_tx_0 indicates the EPRE for the SSB/CSI-RS.

The procedure 500 may further include determining a reception power for the uplink transmission in 504. In particular, the base station may utilize the characteristics, or some portion thereof, reported in 406 to determine the reception power for the uplink transmission. For example, the base station may utilize the L1-RSRP report in 406 to determine the reception power for the uplink transmission. The base station may further utilize the P_tx determined in 502 and/or the EPRE for the SSB/CSI-RS to determine the reception power for the uplink transmission. In a second stage of the first option and the second option, the Rx power can be calculated by P_rx=P_tx+L1-RSRP−P_tx_0, where P_tx_0 indicates the energy per resource element (EPRE) for the SSB/CSI-RS.

The procedure 500 may further include determining a preferred beam for uplink transmission in 506. For example, the base station may compare the reception power determined for one or more beams of the UE to determine a beam with best reception power to be the preferred beam for uplink transmission. The best reception power may be the beam with the highest reception power that meets characteristics for a transmission (such as the frequency of the transmission, the resource to be utilized for the transmission, whether the reception power meets a threshold power for the transmission, and/or other characteristics of the transmission). In some instances, the base station may perform 502 and 504 on one or more beams of the UE to determine the reception powers for the beams. The base station may then compare the reception powers determined in 504 and/or reception powers for other beams of the UE to determine the preferred beam. When the Rx power for two beams are the same, gNB can select the one with smallest Tx power with regard to power saving. For example, in instances where two or more beams are determined to have the same reception power and are tied for the highest reception power that meets the characteristics of the transmission, the base station may determine the preferred beam to be the beam of the two or more beams with the smallest transmission power (such as the transmission power determined in 502). Selecting the beam of the two or more beams with the smallest transmission power may provide power savings of communication with the UE. Further, in some instances, the beams that the base station compares or determines to be the preferred beam from the two or more beams may be beams that available for the transmission (such as beams that are not currently scheduled for another transmission or are unavailable for the particular transmission).

In some embodiments, a transmission configuration indicator (TCI) of a unified beam indication framework may be utilized for applying the preferred beam to one or more uplink channels. Based unified beam indication framework, where one beam indication signaling, e.g. transmission configuration indicator (TCI) may be applied to multiple uplink channels, e.g. PUSCH, PUCCH and SRS. For example, the TCI may indicate that the preferred beam may be applied to multiple uplink channels, such as a PUSCH, a PUCCH, and/or a sounding reference signal (SRS). However the best beam could be different for different bandwidth allocation.

In some embodiments, different channels may have different preferred beams. For example, a channel with a first bandwidth allocation may be determined to have a first preferred beam and a channel with a second bandwidth allocation may be determined to have a second preferred beam, the second preferred beam being different from the first. In these embodiments, different TCI states having different preferred beams may be provided for different uplink channels.

In a first option of the embodiments, the uplink channels can be grouped based on the allocated bandwidth and the unified beam indication framework can provide 2 TCI states. For example, different TCI states of the unified beam indication framework may be provided for different groups of uplink channels, where the channels may be grouped based on allocated bandwidths. The uplink channels may be grouped into a first group of uplink signals having a bandwidth larger than a threshold and a second group of uplink signals having a bandwidth smaller than or equal to the threshold. The first TCI State may be applied to the uplink channels with bandwidth larger than a threshold. The second TCI State may be applied to the uplink channels with bandwidth smaller than or equal to a threshold. For example, a first TCI state may be applied to the first group of uplink channels with bandwidth larger than the threshold and a second TCI state may be applied to the second group of uplink channels with the bandwidth smaller than or equal to the threshold. The threshold can be configured by higher layer signaling, e.g. RRC or MAC CE. For example, the TCI states may be provided by MAC CE or DCI. The threshold may be allocated by higher layer signaling, such as radio resource control (RRC) or medium access control (MAC) control element CE.

In a second option of the embodiments, the unified beam indication framework can provide N TCI States for multiple bandwidth part (BWP). For example, the unified beam indication framework can provide multiple TCI states for multiple bandwidth parts (BWPs). Each TCI state may be applied to one BWP with regard to different bandwidth for different BWPs. For both the first option and the second option, the TCI states may be provided by MAC CE or DCI. In some embodiments, 506 may be omitted.

Determining the reception power of the beam or beams may assist the RAN in properly identifying and/or interpreting transmissions from the UE. For example, the base station may identify transmissions from the UE around the determined reception power and/or interpret the transmissions based on the determined reception power. Further, determining the preferred beam may provide for the transmissions of the UE to be of an adequate quality to be properly identified and/or interpreted.

The procedure 500 may further include indicating the preferred beam for uplink transmission to the UE in 508. In a third stage of both the first option and the second option, gNB can indicate the beam for the uplink transmission with the best Rx power. For example, the preferred beam determined in 506 may be indicated to the UE for uplink transmission. The UE may then utilize the preferred beam for uplink transmission. In some embodiments, 508 may be omitted.

Figure 10:
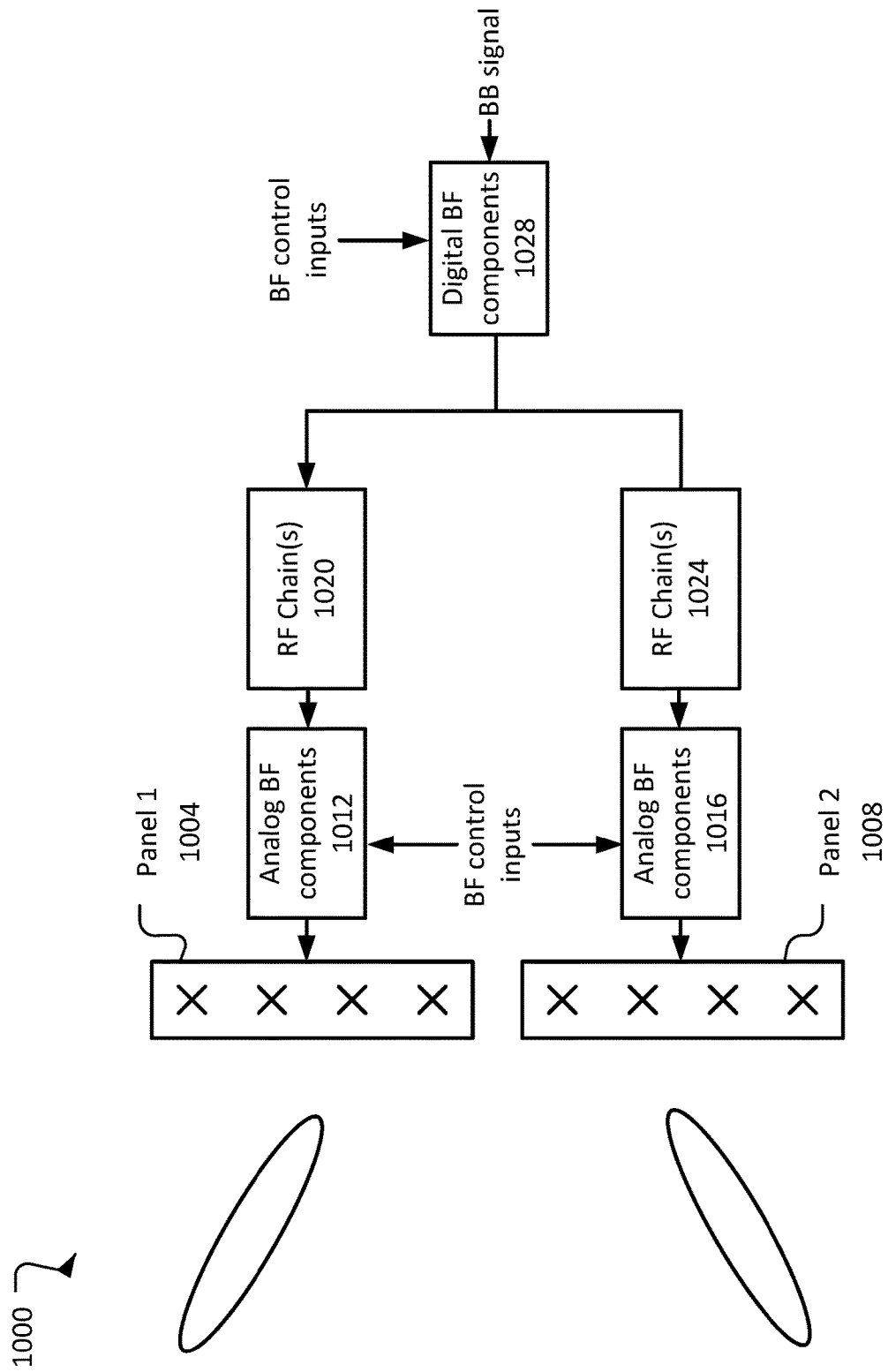
FIG. 10 illustrates example beamforming circuitry in accordance with some embodiments.

FIG. 10 illustrates example beamforming circuitry 1000 in accordance with some embodiments. The beamforming circuitry 1000 may include a first antenna panel, panel 1 1004, and a second antenna panel, panel 2 1008. Each antenna panel may include a number of antenna elements. Other embodiments may include other numbers of antenna panels.

Digital beamforming (BF) components 1028 may receive an input baseband (BB) signal from, for example, a baseband processor such as, for example, baseband processor 1104A of FIG. 11. The digital BF components 1028 may rely on complex weights to pre-code the BB signal and provide a beamformed BB signal to parallel radio frequency (RF) chains 1020/1024.

Each RF chain 1020/1024 may include a digital-to-analog converter to convert the BB signal into the analog domain; a mixer to mix the baseband signal to an RF signal; and a power amplifier to amplify the RF signal for transmission.

The RF signal may be provided to analog BF components 1012/1016, which may apply additionally beamforming by providing phase shifts in the analog domain. The RF signals may then be provided to antenna panels 1004/1008 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 11 illustrates an example UE 1100 in accordance with some embodiments. The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1100 may be a RedCap UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1 or FR2.

In some embodiments, the UE 1100 may include the beamforming circuitry 1000 (FIG. 11), where the beamforming circuitry 1000 may be utilized for communication with the UE 1100. In some embodiments, components of the UE 1100 and the beamforming circuitry may be shared. For example, the antennas 1126 of the UE may include the panel 1 1004 and the panel 2 1008 of the beamforming circuitry 1000.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where again it periodically wakes up to listen to the network and then powers down again. The UE 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
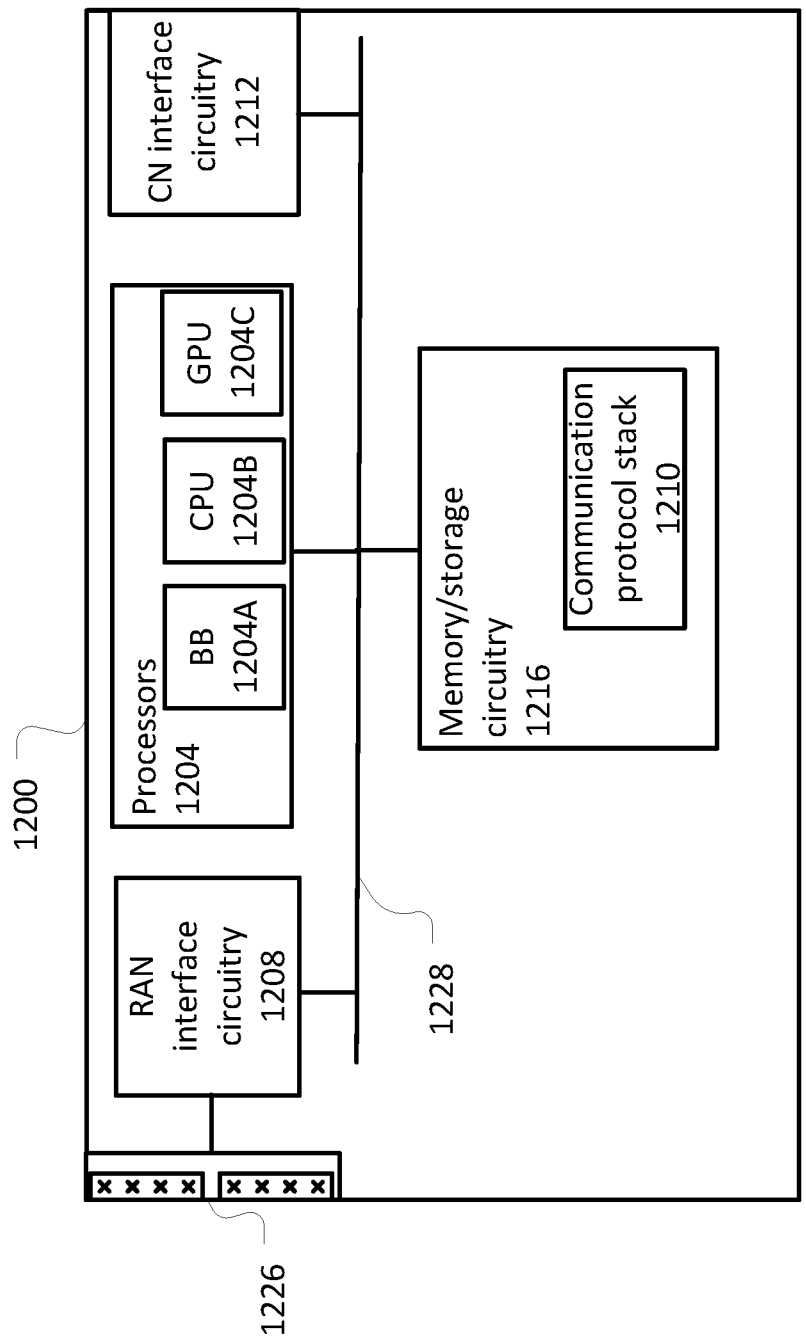
FIG. 12 illustrates an example next generation Node B in accordance with some embodiments.

FIG. 12 illustrates an example gNB 1200 in accordance with some embodiments. The gNB 1200 may include processors 1204, RF interface circuitry 1208, core network (CN) interface circuitry 1212, memory/storage circuitry 1216, and antenna structure 1226.

The components of the gNB 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

As described, one aspect of the present technology is the gathering and use of data available from specific and legitimate sources to determine transmission power and/or reception power for a UE. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for determining a location of a subject, where the determined location may be utilized for determining a transmission power and/or a reception power for a UE.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of determining the location of a subject, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified prior to determining the location of the subject and then reminded again just before the location of the subject is to be determined.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to identify a beam of the UE for radio access network (RAN) communication emitted toward a subject, determine a maximum power reduction (P_MPR) for the beam and a layer 1 reference signal received power (L1-RSRP), and report a value based on the P_MPR, an index of the beam and the L1-RSRP to a base station for determination of a reception (Rx) power related to the beam.

Example 2 may include the one or more computer-readable media of example 1, wherein the instructions, when executed by the one or more processors, further cause the UE to determine a virtual power headroom (PHR) for the beam based on the P_MPR, and report the virtual PHR to the base station for the determination of the Rx power.

Example 3 may include the one or more computer-readable media of example 2, wherein the virtual PHR is to be determined based further on a maximum power transmission (P_cmax) for the beam, and wherein the instructions, when executed by the one or more processors, further cause the UE to report the P_cmax to the base station.

Example 4 may include the one or more computer-readable media of example 1, wherein the indication of the P_MPR is to be reported as a modified maximum transmission power, the modified maximum transmission power equal to a maximum power transmission (P_cmax) minus the P_MPR.

Example 5 may include the one or more computer-readable media of example 2, wherein the virtual PHR is to be determined based further on a targeting receiving power (P0), a factor to compensate for path loss (alpha), a path loss (pathloss), and a closed-loop power control factor (f) for the beam.

Example 6 may include the one or more computer-readable media of example 5, wherein the pathloss is to be determined based on the L1-RSRP.

Example 7 may include the one or more computer-readable media of example 5, wherein the f is to be pre-defined or configured by higher layer signaling.

Example 8 may include the one or more computer-readable media of example 2, wherein the instructions, when executed by the one or more processors, further cause the UE to report a maximum power transmission (P_cmax) for the beam together with the P_MPR, and the PHR as a first candidate value (cri-Phr) within a channel state information (CSI) report configuration (CSI-ReportConfig) information element, and report a beam index for the beam as a second candidate value (ssb-Index-Phr) within the CSI-ReportConfig information element.

Example 9 may include the one or more computer-readable media of example 2, wherein the instructions, when executed by the one or more processors, further cause the UE to report a maximum power transmission (P_cmax) for the beam together with the P_MPR, the PHR, and the L1-RSRP as a first candidate value (cri-Phy-RSRP) within a channel state information (CSI) report configuration (CSI-ReportConfig) information element, and report a beam index for the beam as a second candidate value (ssb-Index-Phy-RSRP) within the CSI-ReportConfig information element.

Example 10 may include the one or more computer-readable media of example 1, wherein the instructions, when executed by the one or more processors, further cause the UE to report a maximum power transmission (P_cmax) for the beam to the base station for the determination of the Rx power related to the beam.

Example 11 may include the one or more computer-readable media of example 10, wherein the instructions, when executed by the one or more processors, further cause the UE to report a closed-loop power control factor (f) for the beam to the base station for the determination of the RX power related to the beam.

Example 12 may include the one or more computer-readable media of example 11, wherein the f is to be predefined or configured by higher layer signaling.

Example 13 may include the one or more computer-readable media of example 10, wherein the P_MPR and the P_cmax are to be reported as a modified maximum transmission power, the modified maximum transmission power equal to the P_cmax minus the P_MPR.

Example 14 may include the one or more computer-readable media of example 10, wherein the instructions, when executed by the one or more processors, further cause the UE to report a closed loop power control factor (f) with the P_cmax and the P_MPR in a first candidate (cri-Pcmax) within a channel state information (CSI) report configuration (CSI-ReportConfig) information element, and report a beam index for the beam as a second candidate value (ssb-Index-Pcmax) within the CSI-ReportConfig information element.

Example 15 may include the one or more computer-readable media of example 10, wherein the instructions when executed by the one or more processors, further cause the UE to report a closed loop power control factor (f) with the P_cmax, P_MPR, and the L1-RSRP as a first candidate (cri-Pcmax-RSRP) within a channel state information (CSI) report configuration (CSI-ReportConfig) information element, and report a beam index for the beam as a second candidate value (ssb-Index-Pcmax-RSRP) within the CSI-ReportConfig information element.

Example 16 may include the one or more computer-readable media of example 1, wherein the P_MPR and the L1-RSRP are to be reported by physical uplink control channel (PUCCH) or physical uplink shared channel (PUSCH).

Example 17 may include the one or more computer-readable media of example 1, wherein to report the value includes to report the value in a channel state information (CSI) report, and wherein the processing circuitry is further to determine a priority for the CSI report to be equal to $2N_{cell}M_S y+N_{cell}M_S k+M_s c+s$, where k is equal to −1, 0, or 2, y is equal to 0 when the CSI report is to be aperiodic and carried on a physical uplink shared channel (PUSCH), y is equal to 1 when the CSI report is to be semi-persistent and carried on the PUSCH, y is equal to 2 when the CSI report is to be semi-persistent and carried on a physical uplink control channel (PUCCH), y is equal to 3 when the CSI report is to be periodic and carried on the PUCCH, c is a serving cell index, $N_{cell}$ is a maximum number of serving cells, s is a report configuration identifier, and $M_s$ is a maximum number of report configurations.

Example 18 may include a user equipment (UE) comprising a plurality of panels to emit a plurality of beams for radio access network (RAN) communication in multiple directions from the UE, and processing circuitry coupled to the plurality of panels, the processing circuitry to identify a beam of the plurality of beams emitted toward a subject, determine a maximum power reduction (P_MPR) for the beam based on a location of the subject relative to the beam, determine a layer 1 reference signal received power (L1-RSRP), and report a value based on the P_MPR, an index of the beam, and the L1-RSRP to a base station for determination of a reception (Rx) power related to the beam.

Example 19 may include the UE of example 18, wherein the processing circuitry is further to determine a maximum power transmission (P_cmax) for the beam, and wherein the value is the P_MPR or a modified maximum transmission power, the modified maximum transmission power equal to the P_cmax minus the P_MPR.

Example 20 may include the UE of example 18, wherein the processing circuitry is further to determine a virtual power headroom (PHR) for the beam based on P_MPR and the P_cmax, and report the virtual PHR to the base station for the determination of the Rx power.

Example 21 may include the UE of example 20, wherein the virtual PHR is to be determined further based on a targeting receiving power (P0), a factor to compensate for path loss (alpha), a path loss (pathloss), and a closed-loop power control factor (f) for the beam.

Example 22 may include the UE of example 21, wherein the pathloss is to be determined based on the L1-RSRP.

Example 23 may include the UE of example 21, wherein the f is to be predefined or configured by higher layer signaling.

Example 24 may include the UE of example 18, wherein the processing circuitry is further to report a closed-loop power control factor (f) for the beam to base station for determination of the Rx power related to the beam.

Example 25 may include the UE of example 24, wherein the f is to be predefined or configured by higher layer signaling.

Example 26 may include the UE of example 18, wherein the P_MPR, the P_cmax, and the L1-RSRP are to be reported by physical uplink control channel (PUCCH) or physical uplink shared channel (PUSCH).

Example 27 may include the UE of example 18, wherein to report the value includes to report the value in a channel state information (CSI) report, and wherein the processing circuitry is further to determine a priority for the CSI report to be equal to $2N_{cell}M_S y+N_{cell}M_S k+M_s c+s$, where k is equal to −1, 0, or 2, y is equal to 0 when the CSI report is to be aperiodic and carried on a physical uplink shared channel (PUSCH), y is equal to 1 when the CSI report is to be semi-persistent and carried on the PUSCH, y is equal to 2 when the CSI report is to be semi-persistent and carried on a physical uplink control channel (PUCCH), y is equal to 3 when the CSI report is to be periodic and carried on the PUCCH, c is a serving cell index, $N_{cell}$ is a maximum number of serving cells, s is a report configuration identifier, and $M_s$ is a maximum number of report configurations.

Example 28 may include a method of operating user equipment (UE) comprising identifying a subject within a certain proximity of the UE, identifying a beam of the UE for radio access network (RAN) communication emitted toward the subject, determining a maximum power reduction (P_MPR) for the beam based on a location of the subject relative to a direction of the beam and a distance from the UE, and reporting a value based on the P_MPR and a layer 1 reference signal received power (L1-RSRP) to base station for determination of a reception (Rx) power related to the beam.

Example 29 may include the method of example 28, further comprising determining a virtual power headroom (PHR) for the beam based on the P_MPR, and reporting the virtual PHR to the base station for the determination of the Rx power.

Example 30 may include the method of example 29, wherein the virtual PHR is determined based further on a maximum power transmission (P_cmax) for the beam, and wherein the method further comprises reporting the P_cmax to the base station.

Example 31 may include the method of example 28, wherein the method further comprises determining a maximum power transmission (P_cmax) for the beam, wherein the value is the P_MPR or a modified maximum transmission power, and wherein the modified maximum transmission power is equal to the P_cmax minus the P_MPR.

Example 32 may include the method of example 29, wherein the virtual PHR is determined based further on a targeting receiving power (P0), a factor to compensate for path loss (alpha), a path loss (pathloss), and a closed-loop power control factor (f) for the beam.

Example 33 may include the method of example 32, further comprising determining the pathloss based on the L1-RSRP.

Example 34 may include the method of example 32, further comprising determining the f based on a predefined value or higher layer signaling.

Example 35 may include the method of example 29, further comprising reporting a maximum power transmission (P_cmax) for the beam together with the P_MPR and the PHR as a first candidate value (cri-Phr) within a channel state information (CSI) report configuration (CSI-ReportConfig) information element, and reporting a beam index for the beam as a second candidate value (ssb-Index-Phr) within the CSI-ReportConfig information element.

Example 36 may include the method of example 29, further comprising reporting a maximum power transmission (P_cmax) for the beam together with the P_MPR, the PHR, and the L1-RSRP as a first candidate value (cri-Phy-RSRP) within a channel state information (CSI) report configuration (CSI-ReportConfig) information element, and reporting a beam index for the beam as a second candidate value (ssb-Index-Phy-RSRP) within the CSI-ReportConfig information element.

Example 37 may include the method of example 28, further comprising reporting a maximum power transmission (P_cmax) for the beam to the base station for the determination of the Rx power related to the beam.

Example 38 may include the method of example 37, further comprising reporting a closed-loop power control factor (f) for the beam to the base station for the determination of the Rx power related to the beam.

Example 39 may include the method of example 38, wherein the f is to be predefined or configured by higher layer signaling.

Example 40 may include the method of example 37, further comprising subtracting the P_MPR from the P_cmax to produce a modified maximum transmission power, wherein the P_MPR and the P_cmax are reported as the modified maximum transmission power.

Example 41 may include the method of example 37, further comprising reporting a closed loop power control factor (f) with the P_cmax and the P_MPR in a first candidate (cri-Pcmax) within a channel state information (CSI) report configuration (CSI-ReportConfig) information element, and reporting a beam index for the beam as a second candidate value (ssb-Index-Pcmax) within the CSI-ReportConfig information element.

Example 42 may include the method of example 37, further comprising reporting a closed loop power control factor (f) with the P_cmax, P_MPR, and the L1-RSRP as a first candidate (cri-Pcmax-RSRP) within a channel state information (CSI) report configuration (CSI-ReportConfig) information element, and reporting a beam index for the beam as a second candidate value (ssb-Index-Pcmax-RSRP) within the CSI-ReportConfig information element.

Example 43 may include the method of example 28, wherein the P_MPR and the L1-RSRP are reported by physical uplink control channel (PUCCH) or physical uplink shared channel (PUSCH).

Example 44 may include the method of example 28, wherein reporting the value includes reporting the value in a channel state information (CSI) report, and wherein the method further comprises determining a priority for the CSI report to be equal to $2N_{cell}M_s y + N_{cell}M_s k + M_s c + s$, where k is equal to −1, 0, or 2, y is equal to 0 when the CSI report is to be aperiodic and carried on a physical uplink shared channel (PUSCH), y is equal to 1 when the CSI report is to be semi-persistent and carried on the PUSCH, y is equal to 2 when the CSI report is to be semi-persistent and carried on a physical uplink control channel (PUCCH), y is equal to 3 when the CSI report is to be periodic and carried on the PUCCH, c is a serving cell index, $N_{cell}$ is a maximum number of serving cells, s is a report configuration identifier, and $M_s$ is a maximum number of report configurations.

Example 45 may include one or more computer-readable media having instructions that, when executed by one or more processors, cause a base station to process a report from a user equipment (UE) to determine an index, a value based on a maximum power reduction (P_MPR), and a layer 1 reference signal received power (L1-RSRP) that corresponds to a beam, determine a transmission (Tx) power for an uplink (UL) transmission of the beam of a user equipment (UE) based on the value, and determine a reception (Rx) power for the beam based on the transmission power and the L1-RSRP.

Example 46 may include the one or more computer-readable media of example 45, wherein the Tx power is to be determined based further on a virtual power headroom (PHR) for the beam indicated by the UE.

Example 47 may include the one or more computer-readable media of example 46, wherein the Tx power is to be determined based further on a maximum power transmission (P_cmax) for the beam indicated by the UE.

Example 48 may include the one or more computer-readable media of example 45, wherein the Tx power is to be determined based further on a number of scheduled resource blocks (RBs) for the beam, a subcarrier spacing scaler for the beam, and a factor (delta) determined by modulation and coding scheme (MCS) for the UE.

Example 49 may include the one or more computer-readable media of example 45, wherein the Rx power is to be determined based further on an energy per resource element (EPRE) for a synchronization signal/physical broadcast channel block (SSB)/channel state information reference signal (CSI-RS) for the UE.

Example 50 may include the one or more computer-readable media of example 45, wherein the Tx power is to be determined based further on the L1-RSRP, a closed loop power control factor (f) indicated by the UE, and a maximum power transmission (P_cmax) for the beam indicated by the UE.

Example 51 may include the one or more computer-readable media of example 45, wherein the Tx power is to be determined based further on a targeting receiving power (P0) for the UE, a number of scheduled resource blocks (RBs) for the beam, a factor to compensate for path loss (alpha) of the beam, and a factor (delta) determined by modulation and coding scheme (MCS) for the UE.

Example 52 may include the one or more computer-readable media of example 45, wherein the instructions, when executed by the one or more processors, are further to cause the gNB to compare the Rx power with Rx powers associated with other beams of the UE, and indicate a preferred beam for UL transmission based on the comparison to the UE.

Example 53 may include a next generation Node B (gNB) comprising memory to store data provided to the gNB by a user equipment (UE), processing circuitry coupled with the memory, the processing circuitry to identify a value based on a maximum power reduction (P_MPR) for a beam indicated by a UE and a layer 1 reference signal received power (L1-RSRP) indicated by a UE, determine a transmission (Tx) power for an uplink (UL) transmission of the beam of the UE based on the value, and determine a reception (Rx) power for the beam based on the Tx power and the L1-RSRP.

Example 54 may include the gNB of example 53, wherein the processing circuitry is further to identify a virtual power headroom (PHR) for the beam indicated by the UE, and wherein the Tx power is to be determined based further on a virtual PHR.

Example 55 may include the gNB of example 54, wherein the processing circuitry is further to identify a maximum power transmission (P_cmax) for the beam indicated by the UE, and wherein the TX power is to be determined based further on the P_cmax.

Example 56 may include the gNB of example 53, wherein the Tx power is to be determined based further on a number of scheduled resource blocks (RBs) for the beam, a subcarrier spacing scaler for the beam, and a factor (delta) determined by modulation and coding scheme (MCS) for the UE.

Example 57 may include the gNB of example 53, wherein the Rx power is to be determined based further on an energy per resource element (EPRE) for a synchronization signal/ physical broadcast channel block (SSB)/channel state information reference signal (CSI-RS) for the UE.

Example 58 may include the gNB of example 53, wherein the processing circuitry is further to identify a closed loop power control factor (f) indicated by the UE and a maximum power transmission (P_cmax) for the beam indicated by the UE, and wherein the Tx power is to be determined based further on the L1-RSRP, the f, and the P_cmax.

Example 59 may include the gNB of example 53, wherein the Tx power is to be determined based further on a targeting receiving power (P0) for the UE, a number of scheduled resource blocks (RBs) for the beam, a factor to compensate for path loss (alpha) of the beam, and a factor (delta) determined by modulation and coding scheme (MCS) for the UE.

Example 60 may include the gNB of example 53, wherein the processing circuitry is further to compare the Rx power with Rx powers associated with other beams of the UE, and indicate a preferred beam for UL transmission based on the comparison to the UE.

Example 61 may include a method of operation a next generation Node B (gNB) comprising determining a transmission (Tx) power for an uplink (UL) transmission of a beam of a user equipment (UE) based on value related to a maximum power reduction (P_MPR) for the beam indicated by the UE, determining a reception (Rx) power for the beam based on the transmission power and a layer 1 reference signal received power (L1-RSRP) indicated by the UE, and determining a preferred beam for UL transmission of the UE based on the Rx power.

Example 62 may include the method of example 61, wherein the Tx power is to be determined based further on a virtual power headroom (PHR) for the beam indicated by the UE.

Example 63 may include the method of example 62, wherein the Tx power is to be determined based further on a maximum power transmission (P_cmax) for the beam indicated by the UE.

Example 64 may include the method of example 61, wherein the Tx power is to be determined based further on a number of scheduled resource blocks (RBs) for the beam, a subcarrier spacing scaler for the beam, and a factor (delta) determined by modulation and coding scheme (MCS) for the UE.

Example 65 may include the method of example 61, wherein the Rx power is to be determined based further on an energy per resource element (EPRE) for a synchronization signal/physical broadcast channel block (SSB)/channel state information reference signal (CSI-RS) for the UE.

Example 66 may include the method of example 61, wherein the Tx power is to be determined based further on the L1-RSRP, a closed loop power control factor (f) indicated by the UE, and a maximum power transmission (P_cmax) for the beam indicated by the UE.

Example 67 may include the method of example 61, wherein the Tx power is to be determined based further on a targeting receiving power (P0) for the UE, a number of scheduled resource blocks (RBs) for the beam, a factor to compensate for path loss (alpha) of the beam, and a factor (delta) determined by modulation and coding scheme (MCS) for the UE.

Example 68 may include a method of operating a base station comprising processing a report from a user equipment (UE), determining a beam to be utilized by the UE based on information from the report, and transmitting an indication of the beam to the UE to indicate that the beam is to be applied to multiple uplink channels of the UE.

Example 69 may include the method of example 68, wherein the beam is a first beam, wherein the multiple uplink channels are uplink channels having a bandwidth larger than a threshold, and wherein the method further comprises determining a second beam to be utilized for uplink channels having a bandwidth smaller than the threshold, and transmitting an indication of the second beam to the UE to indicate that the second beam is to be applied to the uplink channels having a bandwidth smaller than the threshold.

Example 70 may include the method of example 68, wherein the beam is a first beam, wherein the multiple uplink channels are uplink channels corresponding to a first bandwidth part, and wherein the method further comprises determining a second beam to be utilized for uplink channels corresponding to a second bandwidth part, and transmitting an indication of the second beam to the UE to indicate that the second beam is to be applied to the uplink channels corresponding to the second bandwidth part.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   identify a beam of a user equipment (UE) for radio access network (RAN) communication emitted toward a subject;
   determine a maximum power reduction (P_MPR) for the beam and a layer 1 reference signal received power (L1-RSRP);
   determine a virtual power headroom (PHR) for the beam based on the P_MPR;
   determine a candidate value by combining the virtual PHR and the P_MPR to produce the candidate value; and
   generate a report that includes the candidate value, an index of the beam and the L1-RSRP for transmission to a base station for determination of a reception (Rx) power related to the beam.

2. The one or more non-transitory computer-readable media of claim 1, wherein the virtual PHR is to be determined based further on a maximum power transmission (P_cmax) for the beam, and wherein the instructions, when executed, further cause the processing circuitry to report the P_cmax to the base station.

3. The one or more non-transitory computer-readable media of claim 1, wherein the virtual PHR is to be determined based further on a targeting receiving power (P0), a factor to compensate for path loss (alpha), a path loss (pathloss), and a closed-loop power control factor (f) for the beam.

4. The one or more non-transitory computer-readable media of claim 1, wherein the instructions, when executed, further cause the processing circuitry to:
generate a message that includes a modified maximum transmission power for transmission to the base station, the modified maximum transmission power equal to a maximum power transmission (P_cmax) minus the P_MPR.

5. The one or more non-transitory computer-readable media of claim 1, wherein the instructions, when executed, further cause the processing circuitry to generate a second report including a maximum power transmission (P_cmax) for the beam for transmission to the base station for the determination of the Rx power related to the beam.

6. The one or more non-transitory computer-readable media of claim 5, wherein the second report includes a closed-loop power control factor (f) for the beam for transmission to the base station for the determination of the Rx power related to the beam.

7. The one or more non-transitory computer-readable media of claim 5, wherein the P_MPR and the P_cmax are to be reported as a modified maximum transmission power, the modified maximum transmission power equal to the P_cmax minus the P_MPR.

8. A baseband processor comprising:
processing circuitry to:
identify a beam of a plurality of beams emitted toward a subject;
determine a maximum power reduction (P_MPR) for the beam based on a location of the subject relative to the beam;
determine a layer 1 reference signal received power (L1-RSRP);
determine a virtual power headroom (PHR) for the beam based on the P_MPR;
determine a candidate value by combining the virtual PHR and the P_MPR to produce the candidate value; and
generate a report that includes the candidate value, an index of the beam, and the L1-RSRP for transmission to a base station for determination of a reception (Rx) power related to the beam; and
interface circuitry coupled with the processing circuitry, the interface circuitry to communicatively couple the processing circuitry with a component of an apparatus.

9. The baseband processor of claim 8, wherein the processing circuitry is further to:
determine a maximum power transmission (P_cmax) for the beam; and
generate a message that includes a modified maximum transmission power for transmission to the base station, the modified maximum transmission power equal to the P_cmax minus the P_MPR.

10. The baseband processor of claim 8, wherein the virtual PHR is to be determined further based on a targeting receiving power (P0), a factor to compensate for path loss (alpha), a path loss (pathloss), and a closed-loop power control factor (f) for the beam.

11. The baseband processor of claim 10, wherein the pathloss is to be determined based on the L1-RSRP.

12. The baseband processor of claim 8, wherein the processing circuitry is further to generate a second report including a closed-loop power control factor (f) for the beam for transmission to the base station for determination of the Rx power related to the beam.

13. The baseband processor of claim 8, wherein the report is to be transmitted by physical uplink control channel (PUCCH) or physical uplink shared channel (PUSCH).

14. The baseband processor of claim 8, wherein the report comprises a channel state information (CSI) report, and wherein the processing circuitry is further to determine a priority for the CSI report to be equal to $2N_{cell}M_s y + N_{cell}M_s k + M_s c + s$, where k is equal to −1, 0, or 2, y is equal to 0 when the CSI report is to be aperiodic and carried on a physical uplink shared channel (PUSCH), y is equal to 1 when the CSI report is to be semi-persistent and carried on the PUSCH, y is equal to 2 when the CSI report is to be semi-persistent and carried on a physical uplink control channel (PUCCH), y is equal to 3 when the CSI report is to be periodic and carried on the PUCCH, c is a serving cell index, $N_{cell}$ is a maximum number of serving cells, s is a report configuration identifier, and $M_s$ is a maximum number of report configurations.

15. One or more non-transitory computer-readable media having instructions that, when executed, cause processing circuitry to:
process a report received from a user equipment (UE) to determine an index, a maximum power reduction (P_MPR), and a layer 1 reference signal received power (L1-RSRP) that corresponds to a beam, the report including a candidate value used for determination of the P_MPR, the candidate value produced by combining a virtual power headroom (PHR) for the beam and the P_MPR;
determine a transmission (Tx) power for an uplink (UL) transmission of the beam of a user equipment (UE) based on the P_MPR; and
determine a reception (Rx) power for the beam based on the transmission power and the L1-RSRP.

16. The one or more non-transitory computer-readable media of claim 15, wherein the Tx power is to be determined based further on the virtual PHR.

17. The one or more non-transitory computer-readable media of claim 15, wherein the Tx power is to be determined based further on a number of scheduled resource blocks (RBs) for the beam, a subcarrier spacing scaler for the beam, and a factor (delta) determined by modulation and coding scheme (MCS) for the UE.

18. The one or more non-transitory computer-readable media of claim 15, wherein the Tx power is to be determined based further on the L1-RSRP, a closed loop power control factor (f) indicated by the UE, and a maximum power transmission (P_cmax) for the beam indicated by the UE.

19. The one or more non-transitory computer-readable media of claim 15, wherein the virtual PHR is determined further based on a targeting receiving power (P0), a path loss (pathloss), a factor to compensate for pathloss (alpha), or a closed-loop power control factor (f) for the beam.

* * * * *